(12) United States Patent
Fender et al.

(10) Patent No.: US 10,783,143 B2
(45) Date of Patent: Sep. 22, 2020

(54) COMPUTING COLUMNAR INFORMATION DURING JOIN ENUMERATION

(71) Applicant: Oracle International Corporation, Redwood Shores, CA (US)

(72) Inventors: Pit Fender, Union City, CA (US); Benjamin Schlegel, Merced, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 293 days.

(21) Appl. No.: 15/791,712

(22) Filed: Oct. 24, 2017

(65) Prior Publication Data

US 2019/0121891 A1 Apr. 25, 2019

(51) Int. Cl.
*G06F 16/2453* (2019.01)

(52) U.S. Cl.
CPC .. *G06F 16/24544* (2019.01); *G06F 16/24535* (2019.01); *G06F 16/24537* (2019.01); *G06F 16/24545* (2019.01)

(58) Field of Classification Search
CPC ......... G06F 16/24544; G06F 16/24535; G06F 16/24537; G06F 16/24545; G06F 16/24542; G06F 16/2453; G06F 16/22; G06F 16/2458; G06F 16/2445; G06F 16/24549; G06F 16/2455; G06F 16/221; G06F 16/248; G06F 16/2456; G06F 16/2471; G06F 16/245; G06F 16/2237; G06F 16/24547; G06F 16/23; G06F 16/24561; G06F 16/1865; G06F 16/24; G06F 16/334; G06F 16/8373
See application file for complete search history.

(56) References Cited

U.S. PATENT DOCUMENTS

2005/0097078 A1* 5/2005 Lohman ............ G06F 16/90335
2014/0172914 A1* 6/2014 Elnikety ............. G06F 16/9024
707/774

OTHER PUBLICATIONS

POstgreSQL, "18.6. Query Planning", 18.6.1. Planner Method Configuration, https://www.postgresql.org/docs/9.0/static/runtime-config-query.html, last viewed on Oct. 27, 2017, 5 pages.
Leis et al., "How Good Are Query Optimizers, Really?", Proceedings of the VLDB Endowment, vol. 9, No. 3 Copyright 2015, 12 pages.
Haas et al., "SEEKing the Truth About Ad Hoc Joint Costs", IBM Almaden Research Center, dated May 1993, 27 pages.

* cited by examiner

*Primary Examiner* — Pierre M Vital
*Assistant Examiner* — Andalib F Lodhi
(74) *Attorney, Agent, or Firm* — Hickman Palermo Becker Bingham LLP

(57) ABSTRACT

Techniques are described herein for computing columnar information during join enumeration in a database system. The computation occurs in two phases: the first phase involves a pre-computational phase that is only run once per query block to initialize and prepare a set of data structures. The second phase is an incremental approach that takes place for every query sub-plan. Upon completion of the second phase, the generated projected attributes of a query sub-plan are associated as columnar information associated with the query sub-plan, and used to compute the query execution cost. Subsequently, based on the computed query execution cost, the query sub-plan may be executed as part of the query execution plan.

22 Claims, 8 Drawing Sheets

QUERY 500

SELECT R.name, R.comment, N.name, C.name
FROM   REGION R, NATION N, CUSTOMER C
WHERE  R.regionkey = N.regionkey AND
       N.nationkey = C.nationkey AND
       R.name = AMERICA AND
       N.name = UNITED STATES

FIG. 5A

ATTRIBUTE TO NUMBER MAPPING 510

| ATTRIBUTE NAME 512 | MAPPED NUMBER 514 |
|---|---|
| R.regionkey | 0 |
| R.name | 1 |
| R.comment | 2 |
| N.nationkey | 3 |
| N.regionkey | 4 |
| N.name | 5 |
| C.nationkey | 6 |
| C.name | 7 |

FIG. 5B

OPERATION TO NUMBER MAPPING 520

| OPERATION STRING 522 | MAPPED NUMBER 524 |
|---|---|
| R.name = "AMERICA" | 0 |
| N.name = "UNITED STATES" | 1 |
| R.regionkey = N.regionkey | 2 |
| N.nationkey = C.nationkey | 3 |

FIG. 5C

OPERATION TO ATTRIBUTE MAPPING 530

| OPERATION NUMBER 532 | REFERENCED ATTRIBUTES 534 |
|---|---|
| 0 | {1} |
| 1 | {5} |
| 2 | {0,4} |
| 3 | {3,6} |

FIG. 5D

| # 610 | (SUB)PLAN 620 | COMPUTATIONS 630 | PROJECTED ATTRIBUTES 640 |
|---|---|---|---|
| 1 601 | REGION 621 | PHASE ONE<br>AvailableAttBitVec = {0, 1, 2}<br>AppliedOpBitVec = {0}<br>631 | {0, 1, 2} 641 |
| 2 602 | NATION 622 | PHASE ONE<br>AvailableAttBitVec = {3, 4, 5}<br>AppliedOpBitVec = {1}<br>632 | {3, 4, 5} 642 |
| 3 603 | REGION ⋈ NATION 623 | PHASE TWO<br>AvailableAttBitVec = {0, 1, 2} ∪ {3, 4, 5}<br>AppliedOpBitVec = {0} ∪ {1} ∪ {2}<br>Remaining Op = OpBitVec & ~AppliedOpBitVec<br>= {0, 1, 2, 3} & ~{0, 1, 2, 3} = { }<br>Loop over remaining Op ({3}) -><br>∪ over Referenced Attributes: {3, 6}<br>Result: ({3,6} ∪ ReqAttBitVec {1, 2, 5, 7})<br>AvailableAttBitVec {0, 1, 2, 3, 4, 5} = {1, 2, 3, 5}<br>633 | {1, 2, 3, 5} 643 |
| 4 604 | CUSTOMER 624 | PHASE ONE<br>AvailableAttBitVec = {6, 7}<br>AppliedOpBitVec = { }<br>634 | {6, 7} 644 |
| 5 605 | REGION ⋈ CUSTOMER ⋈ NATION 625 | PHASE TWO<br>AvailableAttBitVec = {1, 2, 3, 5} ∪ {6, 7}<br>AppliedOpBitVec = {0, 1, 2} ∪ { } ∪ {3}<br>Remaining Op = OpBitVec \ AppliedOpBitVec<br>= {0,1,2, 3} \ {0, 1, 2, 3} = { }<br>Loop over remaining Op ({ }) -><br>∪ over Referenced Attributes: { }<br>Result: ({ } ∪ ReqAttBitVec {1, 2, 5, 7})<br>AvailableAttBitVec {0, 1, 2, 3, 5, 6, 7} = {1, 2, 5, 7}<br>635 | {1, 2, 5, 7} 645 |

FIG. 6

COMPUTING COLUMNAR INFORMATION DURING JOIN ENUMERATION

FIELD OF THE INVENTION

The present invention relates to a rapid and inexpensive method for determining the minimal projection list, i.e. columnar information, during join enumeration.

BACKGROUND

Relational and object-relational database management systems store information in tables in a database. To retrieve data, query statements that request data are submitted to a database server. The database server evaluates the queries and returns the requested data. Query statements submitted to the database server conform to syntactical rules of a particular query language. One popular query language, known as the Structured Query Language (SQL), provides users a variety of ways to specify information to be retrieved.

A query submitted to a database server is evaluated by a query optimizer. SQL is a declarative query language. An SQL query that is submitted to a database server yields many different plans to compute the result of the query, i.e., by specifying how to access the data and how to format the data, among other operations.

The query optimizer finds an optimal query plan for the given SQL based on a cost model applied over a search space of the different query plans. Developing a cost model that accurately models the physical execution cost of each operator required within a query plan will lead to the selection of a more efficient query plan by the optimizer.

Described herein are novel approaches for efficient and accurate modeling of the cost associated with execution of operators within a query plan. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5A is a diagram depicting an example SQL query according to an embodiment.

FIG. 5B is a diagram depicting a mapping of attributes to unique numbers for the example query in FIG. 5A according to an embodiment.

FIG. 5C is a diagram depicting a mapping of operations to unique numbers in the example query in FIG. 5A according to an embodiment.

FIG. 5D is a mapping of operations to attributes in the example query in FIG. 5A according to an embodiment.

FIG. 6 is a depiction of the Phase Two algorithm for a sample query plan for the example query in FIG. 5A according to an embodiment.

DETAILED DESCRIPTION

Figure 1:
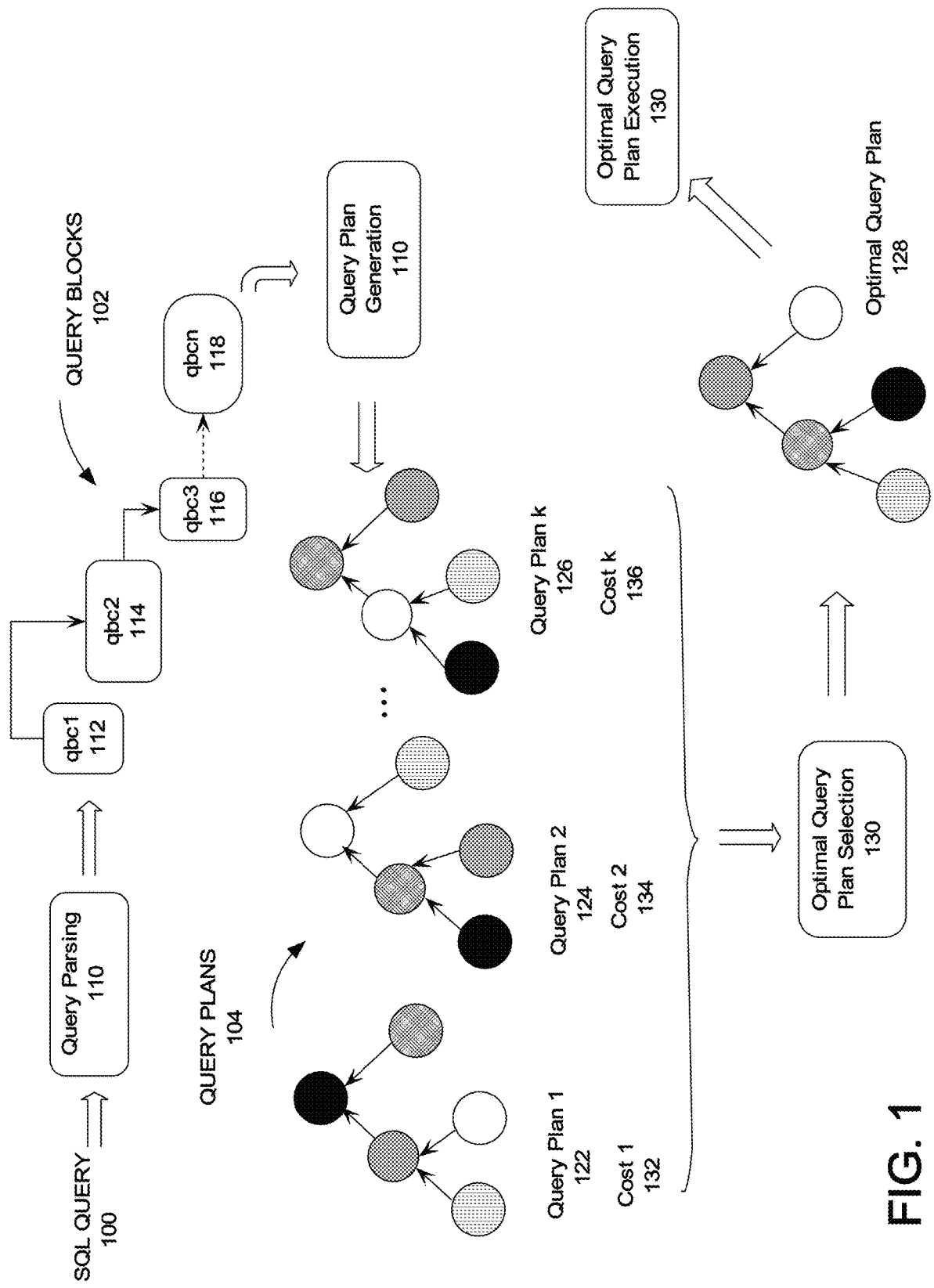
FIG. 1 is a diagram depicting the path of an SQL query in a database system according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview: Database Systems

A database management system (DBMS) manages a database. A DBMS may comprise one or more database servers. A database comprises data stored on a persistent memory mechanism, such as a set of hard disks. Data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting commands to the database server that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

General Overview: Query Plan Optimization

An SQL query submitted to a database server may be parsed to generate an intermediate model. The intermediate model is traversed to generate a set of alternate query plans. Each query plan may be considered a tree of relational operators. The query optimizer keeps track of the cost and properties of each generated query plan, and picks the plan with the least cost. The least-cost plan is passed on to the query execution engine to execute and produce results of the query.

An SQL query may consist of several sub-queries. The generated intermediate model is a set of query blocks—typically one query block per SELECT/FROM/WHERE/GROUP BY/HAVING clause. An example query block is shown below:

```
SELECT Region.name, Region.comment, Nation.Name, Customer.Name
FROM Region, Nation, Customer
WHERE Region.RegionKey = Nation.RegionKey AND
      Nation.NationKey = Customer.NationKey AND
      Region.Name = AMERICA
      Nation.Name = UNITED STATES
```
} Query Block SQL is a declarative query language, and therefore, an SQL query that is submitted to a database server may yield many different, equivalent query plans to compute the result of the query, i.e., by specifying how to access the data and how to format the data, among other operations.

These query plans may be represented by a directed tree graph of interlinked nodes, referred to herein as operators or row sources, that each corresponds to a step of a query plan, referred to herein as a query plan operation. The hierarchy of a directed tree graph represents the order in which the query plan operations are performed and how data flows between each of the execution plan operations. A query plan operator generates a set of rows as output and query plan operations may include, for example, a table scan, an index scan, sort-merge join, nested-loop join, filter, and full outer join.

FIG. 1 depicts an overview of the processing of an input SQL QUERY 100 within a database system. The input query is parsed during Query Parsing 110 into a set of basic units, or QUERY BLOCKS 102, depicted individual as qbc1 112, qbc2 114, qbc3 116, ..., qbcn 118. The QUERY BLOCKS 102 are used during Query Plan Generation 110 to generate different QUERY PLANS 104, i.e., Query Plan 1 122, Query Plan 2 124, ..., Query Plan k 126. Each query plan has a cost associated with the plan, shown as Cost 1 132 associated with Query Plan 1 122, Cost 2 134 associated with Query Plan 2 124, and Cost k 136 associated with Query Plan k 126. Each query plan, each with an associated cost is evaluated during Optimal Query Plan Selection 130, and the selected Optimal Query Plan 128 is sent for execution during Optimal Query Plan Execution 130.

A Query Plan Optimizer is tasked with finding the optimal query plan, and this is done by traversing the search space of equivalent plans and comparing them to determine the most efficient one. The comparison is based on a cost model, and the plan with the lowest cost is chosen. This approach is known as cost-based optimization.

Cost models often consist of two main components: I/O costs and CPU costs. For the I/O costs, most cost models account for the number of pages that are read from storage and that need to be loaded into the buffer pool. The underlying assumption here is that I/O costs are only incurred for access operators like table scan or index scan. It is also assumed that all other operators can be pipelined. For those operations that cannot be pipelined, i.e. pipeline breakers such as a Sort operator that cannot start computation until all the data has come in, the assumption is made that the incoming data does not spill to a storage medium like disk or flash.

For parallel database systems, cost estimation also needs to take the data distribution over the network into consideration. Two commonly taken approaches include: (1) ignoring the network costs, or (2) consider them as part of the I/O costs. In the first approach, the assumption is that the overall network cost component does not differ significantly between different plans, and therefore network costs are ignored while performing plan comparisons. In the second approach, the network is considered as just another access path.

However these assumptions might not accurately apply to database systems that have one or more of the following criteria:

Database runtime systems that do not follow a pipelined approach—such systems materialize all intermediate results. Pipelining involves feeding the output of one operator directly to the next operator, while materializing involves writing the output of one operator to disk, and the next operator reads the data off the disk. These systems may rely on custom hardware and have data-movement acceleration features.

Database runtime systems that exploit vector or batch processing.

Database runtime systems that support massive scaling, and therefore rely heavily on network I/O.

Database runtime systems that make use of offload engines.

If any of the above described characteristics is met, a cost model should include information about what columns are (1) materialized, (2) processed in batches, (3) shipped over the network, and (4) post-processed. This type of information is denoted as columnar information. In particular, columnar information refers to information about what columns, i.e., attributes, are projected by a given operator. This is also referred to as the projection list of an operator. Columnar information also entails the knowledge of how the column is derived, i.e. if the column is a base column that originates from a table or if the column is a result of an expression. Additionally, columnar information gives access to statistics of the produced column or the encoding used. Columnar information is computed by considering the minimal projection list of an operator.

In the absence of columnar information, maximum record width has to be assumed in performing cost estimation. However, this is different from the actual record width that is computed by adding all projected column widths together. In addition to determining the actual record width, it is also important to have encoding and compression information of columns that are projected.

Furthermore, knowledge about what columns are projected at plan-generation time, e.g. when different plans are generated, analyzed for cost, and compared to each other, is very different from computing the minimal projection list at code-generation time. The latter is implemented in any database system using an optimization heuristic, i.e., that the projections of the select clause are pushed down from the root plan node as far as possible. A minimal projection list of an operator follows the same concept, i.e., to not keep unnecessary columns at each operator level, since keeping unnecessary columns increases memory and CPU consumption. As noted earlier, computations of minimal projection lists will always happen at code-generation times, but only once, and for the selected plan. However, for database systems that qualify in any of the above listed criteria, computations of minimal projection lists should happen during the plan generation phase as well.

There are several reasons for this:

For runtime systems that materialize intermediate results, the materialization costs are an important cost factor. However, without knowing on which columns the operator needs to project, it is impossible to determine the materialization costs. One solution is to resort to a maximum record size, e.g. assume all columns that can be produced are also projected. But this leads to very different results and likely ends up in the selection of a non-optimal plan, which will be a bad choice especially for database systems that employ intermediate results materialization.

For runtime systems that exploit vector processing, information about the underlying encoding plays an essential role. This information is a significant factor for estimating the processing costs and determining the rate that tuples can be loaded. Using columnar information as input to the cost formula avoids unreasonable predictions.

If a database system is designed for massive scaling, then the system is heavily dependent on data partitioning and data shipment over the network. Here, columnar information is important for estimating the necessary partitioning. Further network transfer easily can become a bottleneck. Predicting the tuple network-transfer rates is key, and for this, columnar information is essential.

A database system might offload part of the query to an offload engine, from which the system expects results back for further processing or shipment to the client. Often, the offload engine uses different data encodings. Receiving the result from the offload engine means translating them back into the internally used encodings. Columnar information is indispensable in determining these types of post-processing.

Thus, for cost-based optimization, columnar information is very beneficial and, for many some database implementations, even essential. The problems involve computing this information efficiently. Efficient computation is important because of the complexity in traversing the search space. Without any restrictions, the search space grows by n!C(n−1), where n is the number of relations in a query and C denotes the Catalan Numbers. This can be simplified to (2n−2)!/(n−1)!. This reflects the number of plans that are possible to be constructed by allowing for bushy plans and allowing for cross products. Here, bushy plans refers to plans that have no restrictions on the inner input of an operator, i.e. of how many relations the underlying sub-plan can be composed.

When generating a new (sub)plan, at each level during the generation process, i.e. when a new plan is constructed by combining one or more sub-plans with a new operator, the minimal projection list of the new operator needs to be computed. The number of minimal projection list computations is dependent on the search strategies used, but given the complexity of the search space, this number can grow quite large. Therefore it is paramount that computation of the minimal projection be efficient so as to not become the bottleneck of the cost estimator module.

Once the minimal projection list is built, encoding information and compression information per column can be easily determined. With that type of data the average column width and therefore the average column size can be computed in bytes. That, together with cardinality information, is necessary to determine the memory requirements.

The embodiments described below present efficient columnar information computation that works in two phases. This computation adds no significant execution overhead to cost-based optimization.

Computation of the Minimal Projection List

The embodiments presented herein explain how to efficiently compute the minimal projection list for the root of a join (sub)tree during join enumeration. The minimal projection list, also called the projection list, of an operator depends not only on the select clause of the SQL-statement but also on what attributes/columns are available, what predicates have already been applied, and on what predicates still need to be applied. Other factors are whether expressions, orderings, groupings or aggregations have to be applied.

This computation involves a two-phased approach:

Phase One: is a pre-computation phase that is only run once per query block to initialize and prepare the data structures that are used during Phase Two.

Phase Two: is an incremental approach that takes place for every sub-plan. This phase consumes information of previous computations of common plan prefixes.

Upon completion of Phase Two, the projected attributes of a query (sub)plan are generated. The projected attributes are associated as columnar information of the query (sub)plan, and the query execution cost is computed based on the associated columnar information. Subsequently, based on the computed query execution cost, the query (sub)plan may be executed as part of the query execution plan.

Phase One: Set-Up and Pre-Computation

Phase One is more computation-intensive compared to Phase Two because Phase One entails iterating over the structures of the query block, e.g. predicates (local and join predicates), projection list (select clause), Group by list, Order by list, Window functions and Set functions (like Union or Set Difference). Phase Two is more light-weight because in Phase Two is based on an incremental approach. However, Phase Two is also executed many times since this phase is called for every sub-plan that is considered by Phase One.

Figure 2:
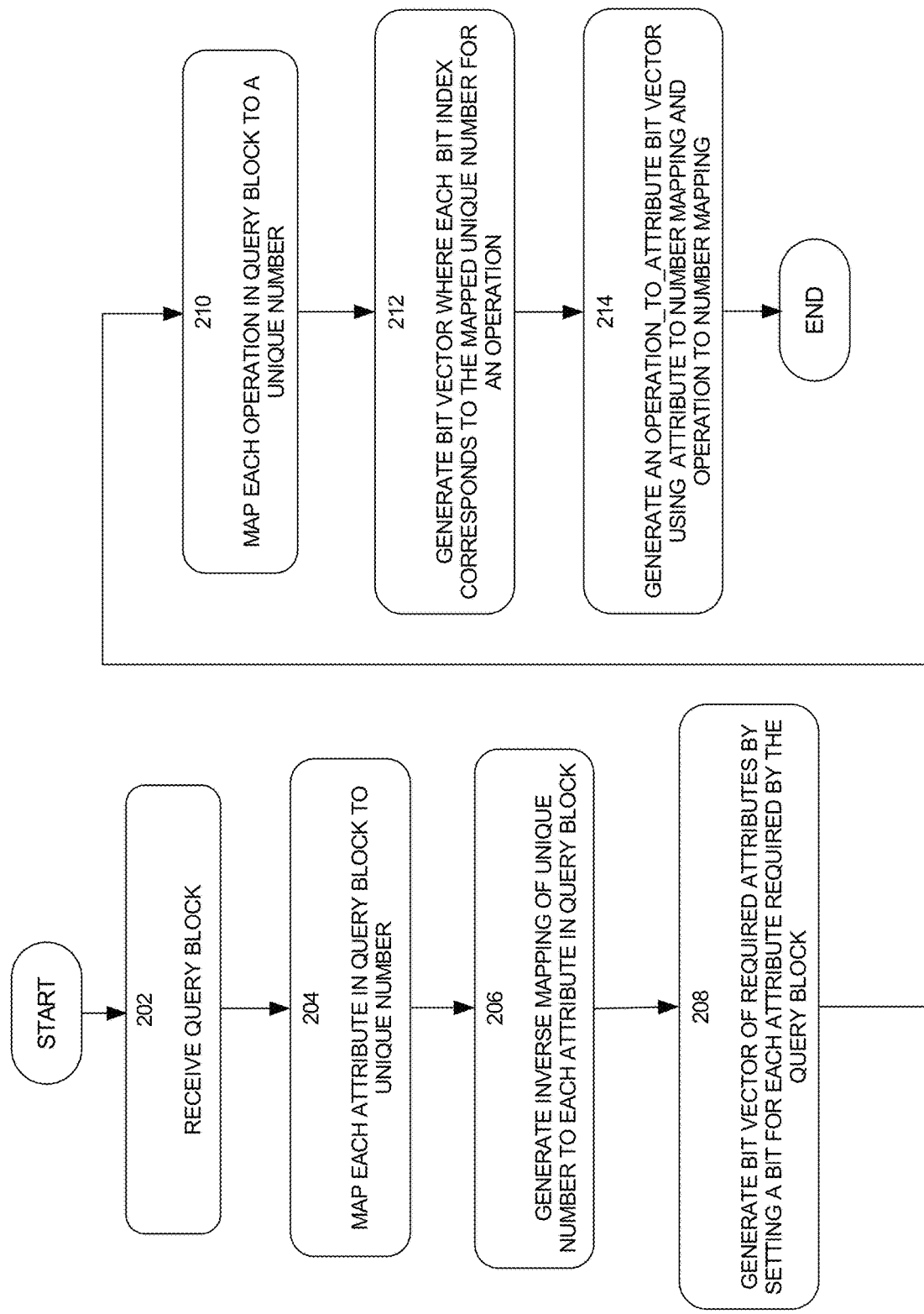
FIG. 2 is a flowchart depicting the Phase One algorithm according to an embodiment.

Phase One makes use of the following declarations:

AttToNumberMap: [attribute→number]: every attribute referenced by the query block is mapped to a unique number NumberToAttMap: [number→attribute]: the inverse mapping of number to attribute is also established ReqAttBitVec: a bit-vector of attributes required to be returned in processing the query block is maintained OpToNumberMap: [operation→number]: every operation within the query block is mapped to a unique number OpBitVec: bitvector of all operations in the query block OpToAttsVecMap: [number→{attributes}]: a mapping of each operator to the set of referenced attributes for that operator The Phase One algorithm is depicted in FIG. 2 and consists of the following operations:

1. A query block is received is received in the first operation 202
2. Next, in operation 204, the attribute to number mapping, AttToNumberMap is populated by gathering all attributes referenced by the query block qbc, and mapping them to numbers in the range 0–(number of attributes−1).
3. In operation 206, the NumberToAttMap mapping, which is the inverse mapping of AttToNumberMap, is computed by mapping a number to an attribute.
4. Next, in operation 208, the required attributes, ReqAttBitVec, which is represented as a bit vector, is generated and populated by setting a bit for each attribute that is required to be returned by the query block. The unique number that is mapped to an attribute in operation 204 (i.e., AttToNumberMap[attribute]) is used as a bit index into ReqAttBitVec. Attributes of the Select Clause, Group by Clause, and Order by Clause are returned.

5. In operation 210, the mapping of query block operations to unique number, OpToNumberMap, is determined by gathering all applicable operations in the query block: Join Predicates, Local Predicates, Order By, Group By, Window functions, and assigning each operation a number in the range 0–(number of operations–1).

6. In operation 212, the bit vector of all operations in the query block OpBitVec is generated by looping over all applicable operations, determining the corresponding mapped number OpToNumberMap[operation] and setting a bit where the bit vector's index corresponds to the number OpToNumberMap[operation].

7. Finally, in operation 214, the operation to attributes vector mapping OpToAttsVecMap is determined by gathering all the referenced attributes for each applicable operation. As can be seen in the pseudo code for the Phase One algorithm, this is done by (i) generating a temporary bit vector, TmpBitVec, using the attributes to number mapping AttToNumberMap[attribute] as bit index into TmpBitVec, (ii) obtaining operation number OpNum by looking up OpToNumberMap[operation], and (iii) storing the bitvector TmpBitVec in the OpToAttsVecMap by assigning: OpToAttsVecMap[OpNum]←TmpBitVec The pseudo-code for the Phase One algorithm is given below. Operations 2 to 4 of the algorithm are covered in lines 3-8 of the pseudo-code. Lines 6-8 implements Operation 4. These lines borrow from C language syntax to denote the conversion from the attribute's assigned number (attCounter) to a bit vector representation. Lines 10-17 implement operations 5 to 7 of the algorithm. Line 16 borrows again from the C syntax to compute the bit vector representation of the attributes referenced by the current operation.

The pseudo-code below depicts the Phase One algorithm:

| Phase One: Pseudo-Code |
| --- |
| PHASEONE(qbc) |
| /* Input: query block qbc */ |
| 1.  attCounter ← 0 |
| 2.  ReqAttBitV ec ← 0 |
| 3.  for attribute ∈ {all attributes in the query block qbc} |
| 4.      AttToNumberMap[attribute] ← attCounter |
| 5.      NumberToAttMap[attCounter] ← attribute |
| 6.      if attribute ∈ {all required attributes} |
| 7.          ReqAttBitVec ← ReqAttBitVec \| (1 << AttCounter) |
| 8.      attCounter ← attCounter + 1 |
| 9.  opCounter ← 0 |
| 10. OpBitVec ← 0 |
| 11. for operation ∈ {all operations in the query block qbc} |
| 12.     OpToNumberMap[qperation] ← opCounter |
| 13.     OpBitVec ← CpBitVec \| (1 << opCounter) |
| 14.     TmpBitVec ← 0 |
| 15.     for attribute ∈ {all referenced attributes in operation} |
| 16.         TmpBitVec ← TmpBitVec \| (1 << AttToNumberMap[attribute]) |
| 17.     OpToAttsVecMap[opCounter] ← TmpBitVec |

Phase Two—Projection List Computation at Join Enumeration Time

Phase Two involves computation of the projection list at join enumeration time. The input to Phase Two are the following two fields:
  AppliedOpBitVec: bit vector of applied operations in input operator trees
  AvailableAttBitVec: bit vector of available attributes provided by input operators These fields are maintained as the join enumerator constructs plans bottom-up. AppliedOpBitVec corresponds to the operations already executed in a sub-plan that is input to the new plan to be constructed. For a join plan, for example, that means that the new plan is constructed out of two sub-plans by making the two sub-plans input to the join operator. The join operator and the two sub-plans then comprise the new plan.

In this example the AppliedOpBitVec then is the union of the two respective AppliedOpBitVec of the two respective sub-plans. The AvailableAttBitVec corresponds to the attributes that are produced by the sub-plans. For the join example this means that AvailableAttBitVec is computed by performing a union of the AvailableAttBitVec's of the two sub-plans. Since the join enumerator/plan generator works bottom-up, the AvailableAttBitVec of the sub-plans have already been computed. In fact, the AvailableAttBitVec of the sub-plans are the result of the Phase II computation of the input sub-plans, corresponding to the minimal projection list of the operator root of the two sub-plans.

Figure 3:
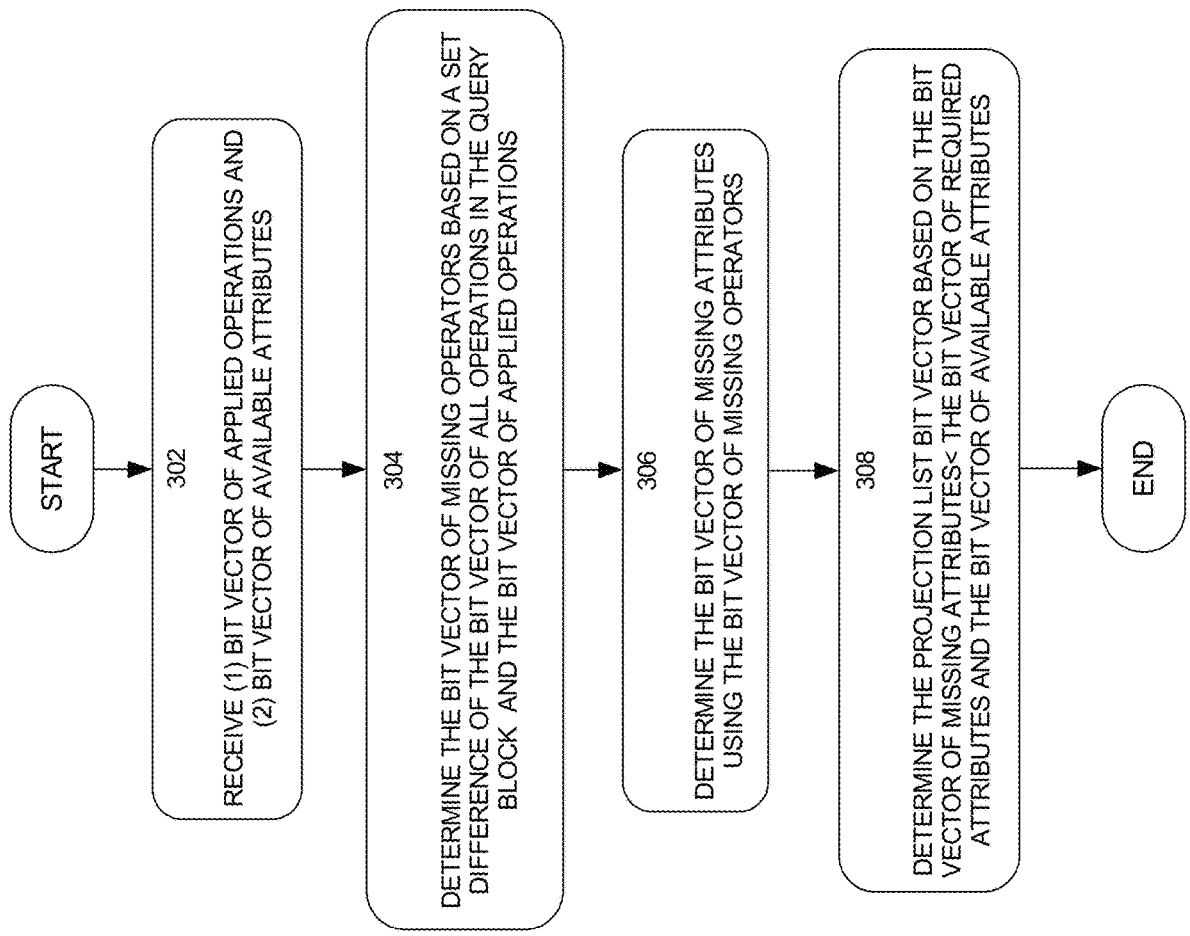
FIG. 3 is a flowchart depicting the Phase Two algorithm according to an embodiment.

The Phase Two algorithm is depicted in FIG. 3, and consists of the following operations:

1. In operation 302, two bit vectors are received as input: (1) AppliedOpBitVec (computed as a union of the AppliedOpBitVec of all the input sub-plans) and (2) AvailableAttBitVec (computed as a union of the AvailableAttBitVec's of the input sub-plans).

2. Operation 304 involves determining the operations that have not yet been applied:
  OpMissingBitVec←OpBitVec & ~AppliedOpBitVec 3. In operation 306, the bit vector of missing attributes is computed. In one embodiment, this is computed as follows: use an iterator variable OpNum to loop over OpMissingBitVec and use the current operation number OpNum to retrieve a bit vector of referenced attributes TmpBitVec. Subsequently, the MissingAttBitVec is computed as a union over all TmpBitVec.

4. In operation 308, the bit vector of the projection list is computed for the sub plan as follows:
  ProjectionList←(MissingAttBitVec ∪ ReqAttBitVec) ∩AvailableAttBitVec While the Phase One algorithm is executed only once per query block, the Phase Two algorithm is executed each time when a new sub-plan is enumerated. The search space for bushy trees grows in the order of (2n−2)!/(n−1)!, where n is the number of relations/tables in the query block. Therefore it is paramount that the Phase Two algorithm be computed very efficiently.

In view of the efficiency requirements, bit vector instructions are used instead of set operations. A bit vector instruction can be executed in a few cycles and is based on native datatypes like uint64. Set operations on the other hand are based on more complex data structures like red-black trees. Therefore any set-operation implemented on top of those data structures needs much more cpu-cycles to be executed.

Operation 2 of the Phase Two algorithm is implemented in Line 1 of the Phase Two pseudo-code. The set difference is mapped to a bitwise AND of the second operand's bitwise complement. The loop in Line 3 iterates over the bits set in OpMissingBitVec. This done in three steps:

First, checking if OpMissingBitVec is not empty (Line 3).

Second, using an assembler instruction like BITSCAN-FORWARD to find the first least significant bit that is set and returning the index of the set bit (Line 4).

Third, unsetting the corresponding bit in OpMissingBitVec (Line 6).

Line 5 implements the core of Operation 3 which is the computation of MissingAttBitVec. The pseudo-code describes an alternate embodiment where this is done without making use of TmpBitVec. Using bit index OpNum, the set of attributes is looked up (OpToAttsVecMap[OpNum]) and added to the set of MissingAttBitVec. Hereby the set-union operation is implemented by making use of a bitwise or |. Operation 4 is implemented with Line 7. As can been seen the ∪ is mapped to a bitwise 'or', i.e., the '|' operator, and the ∩ to a bitwise 'and', i.e., the '&' operator.

The pseudo-code below depicts the Phase Two algorithm:

---
Phase Two: Pseudo Code
---
PHASETWO(AppliedOpBitVec, AvailableAttBitVec)
/* Input: bitvectors of applied operations and available attributes
   Output: a bitvector ProjectionBitVec of attributes */
1. OpMissingBitVec ← OpBitVec & ~ (AppliedOpBitVec)
2. MissingAttBitVec ← 0
3. while OpMissingBitVec ≠ 0
4.   OpNum ← BITSCANFORWARD(OpMissingBitVec)
5.   MissingAttBitVec ← MissingAttBitVec | OpToAttsVecMap[OpNum]
6.   OpMissingBitVec ← OpMissingBitVec − (1 << OpNum)
7. ProjectionBitVec ← (MissingAttBitVec | ReqAttBitVec) & AvailableAttBitVec
8. return ProjectionBitVec Computing Columnar Information The result of a call to PHASETWO is a bit vector representation of the set of projected attributes of the given operator. This bit vector representation is then used to compute the set of attributes using a similar technique as in the Phase Two algorithm to iterate over a bit vector.

Figure 4:
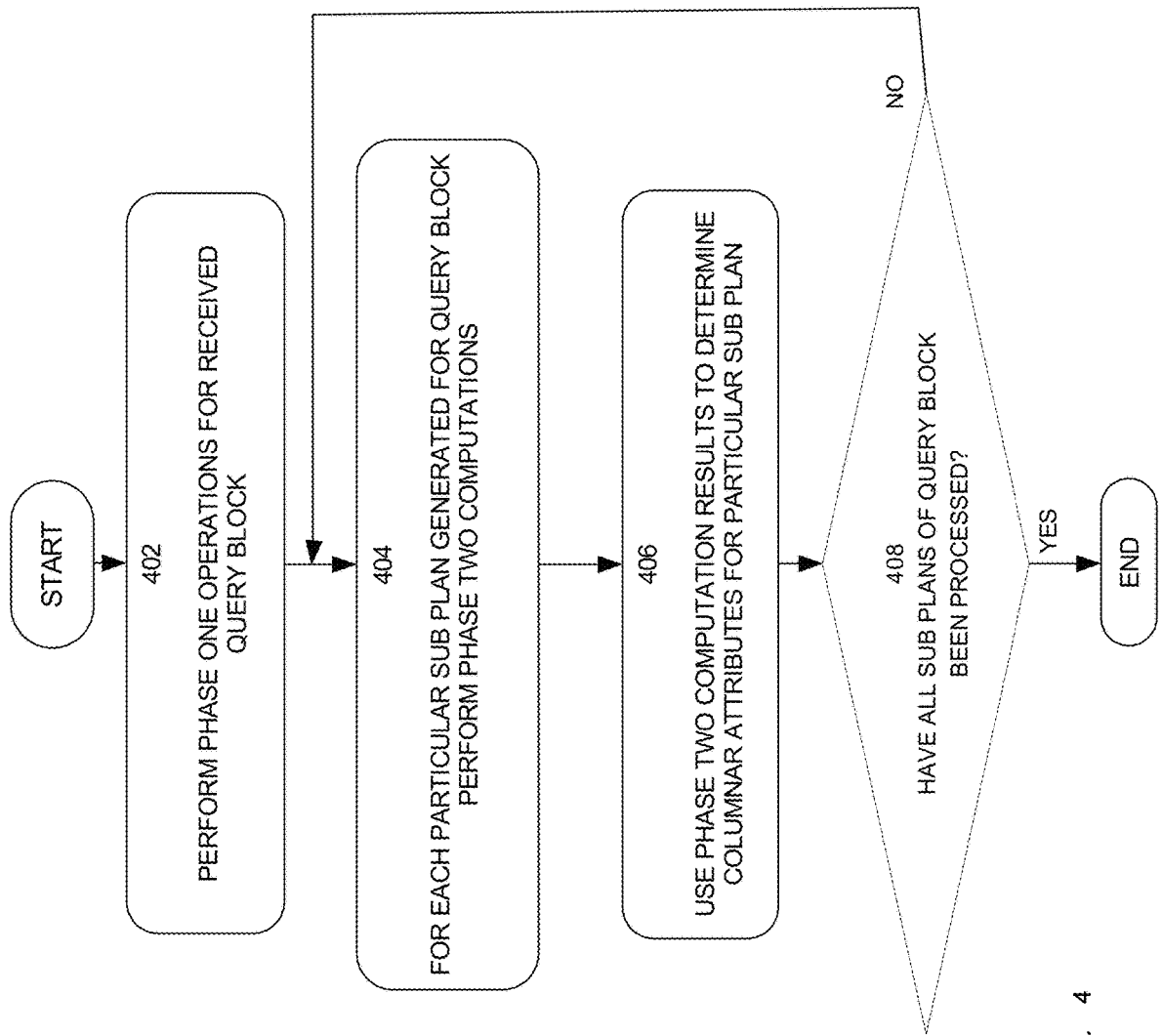
FIG. 4 is a flowchart incorporating the Phase One and Phase Two algorithms while processing an SQL query according to an embodiment.

The pseudo-code COMPUTESETOFATTRIBUTES is depicted below:

---
Compute Set Of Attributes: Pseudo-Code
---
COMPUTESETOFATTRIBUTES(ProjectionBitVec)
/* Input: ProjectionBitVec is a bit vector of projected attributes
   Output: AttributeSet is a set of projected attributes */
1. AttributeSet ← ∅
2. while ProjectionBitVec ≠ 0
3.   AttNum ← BITSCANFORWARD(ProjectionBitVec)
4.   AttributeSet ← AttributeSet ∪ NumberToAttMap[AttNum]
5. return AttributeSet The combined algorithm to determine the columnar information for a query block of a particular query is depicted in FIG. 4, and consists of the following operations: Operation 402 depicts the Phase One algorithm computation for an entire query block. Subsequently, for every sub-plan of the query block, Phase Two algorithm is executed in operation 404, and followed by extracting, in operation 406, the columnar attributes projected for every sub plan using the bit vector of the projection list in operation 404. Operations 404 and 406 are performed for every sub-plan generated for the query block until all the sub-plans have been processed—this is depicted in operation 408.

An Example: Columnar Information Computation

An example query block is shown below and in FIG. 5A:

| SELECT | r_name, r_comment, n_name, c_name |
|---|---|
| FROM | region, nation, customer |
| WHERE | r_regionkey = n_regionkey AND |
|  | n_nationkey = c_nationkey AND |
|  | r_name = AMERICA   AND |
|  | n_name = UNITED STATES |

The Phase One algorithm is applied on the example query. By applying Operation 2 of the algorithm, the AttToNumberMap is populated as displayed in FIG. 5B, with each ATTRIBUTE NAME 512 in the query block mapped to a unique MAPPED NUMBER 514 in the range [0-7]. The ReqAttBitVec for this query will be set to {1, 2, 5, 7} where a set notation is used to exemplify the bit vector (Operation 4). The OpToNumberMap for the query that is computed in Operation 5 of the algorithm is shown in FIG. 5C, with each OPERATION STRING 522 in the query block mapped to a unique MAPPED NUMBER 524. For this query the OpBitVec is set to {0, 1, 2, 3}. Again, a set notation is used to denote the corresponding bit vector. Taking AttToNumberMap (FIG. 5B) and OpToNumberMap (FIG. 5C) as a basis, the OpToAttsVecMap can be computed, as described in Operation 7 of the Phase One Algorithm and shown in FIG. 5D where each OPERATION NUMBER 532 is mapped to its REFERENCED ATTRIBUTES 534.

For the given example query, there are many calls to the Phase Two algorithm. FIG. 6 depicts a table listing five of the Phase Two algorithm runs in numbered rows 1-5 (shown as 601, 602, 603, 604, and 605 in column 610). Each row of the table in FIG. 6, corresponds to a corresponding query sub-plan shown in (SUB)PLANS 620, in particular, REGION 621, NATION 622, JOIN(REGION, NATION) 623, CUSTOMER 624, and JOIN(JOIN(REGION, NATION), CUSTOMER) 625. Phase Two can be embedded in any query plan generator. For this example, a bottom-up based plan generator is assumed. Thus, the (SUB)PLANS 620 column of the table in FIG. 6 lists the four (sub)plans 621-624 that are constructed in order to compute the sub-plan 625 bottom-up. Each row entry lists a separate computation of PHASETWO. The results of the Phase Two algorithm for plans with only one relation (#1 601, #2 602, and #4 604) can be precomputed or cached, for instance, in a dynamic programming based plan generator, i.e., the results correspond to Phase One algorithm runs as depicted in the corresponding COMPUTATIONS 630 column as table entries 631, 632, and 634.

A call to PHASETWO takes two arguments: AppliedOpBitVec and AvailableAttBitVec. In most of the scenarios, those have been computed by a previous call to PHASETWO. For table entry #3 603, for example, the values of AppliedOpBitVec and AvailableAttBitVec are taken from the results of table entries #1 601 and #2 602. For AppliedOpBitVec the own operation's value needs to be included. For table entry #3 603, the Phase Two algorithm run is depicted in table entry 632, which depicts the applied join predicate with the operation number of 2 (see FIG. 5C). Similarly, for table entry #5 605, the Phase Two algorithm run is depicted in table entry 635, which depicts the applied join predicate with the operation number of 3 (see FIG. 5C) the AppliedOpBitVec and AvailableAttBitVec values are taken from the computation of table entry #3 603 and #4 604, i.e., from entries 633 and 634 respectively.

Column 640 of FIG. 6 depicts the PROJECTED ATTRIBUTES determined at the end of each run of the Phase Two algorithm. Thus for each sub-plan depicted in entries 621-625, the projected attributes computed are 641-645 respectively.

Advantages of Computing Columnar Information

The columnar information computation described above can be applied in any database management system. Any generative plan generator, working either bottom-up or top-down would benefit from it.

Embodiments of this invention provide columnar information available to costing models within database management systems. Computation of columnar information can be made accurately, without resorting to worst-case estimation, particularly during query plan optimization.

As noted earlier, several runtime system, such as those that do not follow a pipelined approach, those that exploit vector or batch processing, or those that support massive scaling are particularly sensitive to accurate columnar information that is also computed very efficiently. Some approaches compute a projection list for the operators of the final query execution plan only. This happens at the code generation phase. No approach makes this information available during the plan generation phase. Embodiments to compute the projection list during plan generation proposed herein are different from the approaches that perform computations at the code generation phase. Here are the key distinguishing features:

- The presented complete algorithm only sees a partial query plan, where many operators might not have been planned yet and are added later on during the plan generation process.
- The algorithm can work on a query block basis, and does not need to see the whole plan constructed from the merger of sub-plans from different query blocks.
- The algorithm exploits the results of previous runs.
- The algorithm works in an iterative manner.
- The algorithm is efficient.
- The algorithm can work on plan generation data structures that are usually flat and are much different from the code generation data structures that are typically in form of trees.

Apart from the distinguishing features there are two major contributions of the present approach:

1. Employ a different representation for attributes and operations.
2. Split the computation into two phases: A pre-computation phase and an incremental-computation phase. This split ensures that the results of the pre-computation phase will be applicable for multiple different runs of incremental-computation phase.

The idea behind Item 1 is to alter the representation of attributes and operations such as predicates, group-by operators, order-by operators, and window functions. Considering a projection list as an example: the projection list is represented by a list of pointers that point to structures that describe the attributes in the list. In order to switch to a more powerful representation for the algorithm's purpose, a mapping between attribute pointers to numbers is introduced. Thus, all attributes of the query block are assigned with a number that is unique within the query block. The projection list is then mapped to a set. This is a non-order preserving and duplicate-removing mapping, but is sufficient for the algorithm's purpose. Furthermore, the set is represented by a bit vector. Hence, a list of attribute pointers that takes at least two-word size entries per attribute can now be represented by a word. This representation provides significant storage saving, as well as a significant speedup for any operation to be performed on the original list.

By applying Item 2 above, the algorithm archives in order to factor out multiple working steps that are common to each iteration of the incremental-computation phase. But this is only possible due the Item 1 approach of constructing a compact representation in the pre-computation phase. Additionally, by applying a pre-computation first phase, the second phase of the algorithm can become incremental. Phase one of the algorithm takes place once per query block when the join enumeration is initialized. Phase two takes place for every sub-plan of the query block—consuming information generated from previous computations of common plan prefixes, using results of the runs for each of the sub-plans that are input to the operator plan and comprising the current plan. It is important to note that approaches executed at the code-generation phase require the whole plan tree to be computed already—approaches executed at code-generation do not support an incremental approach where the entire optimal query plan has not yet been determined. An important contribution herein is using the notion that, for the purpose of gathering columnar information for costing, the whole query plan does not need to be made available. The approach behind the pre-computation phase makes this requirement unnecessary.

Exploiting columnar information during costing gives the following advantages:

1. The cost model becomes more fine-grained by considering individual columns instead of whole records, and assuming worst case estimates.
2. Having the knowledge about the columns that are projected enables having knowledge about the encodings used.
3. It is paramount for computing the post-processing costs such as those that occur when a database system ingests intermediate results from database offload engines. Post-processing costs model the amount of effort for reading from network chunks and translating the data into another representation. Examples could be translating from a DSB number to an oracle number or translating dictionary encoding into variable length characters.
4. Columnar information makes network transfer costs predictions more reliable.

Software Overview

Figure 7:
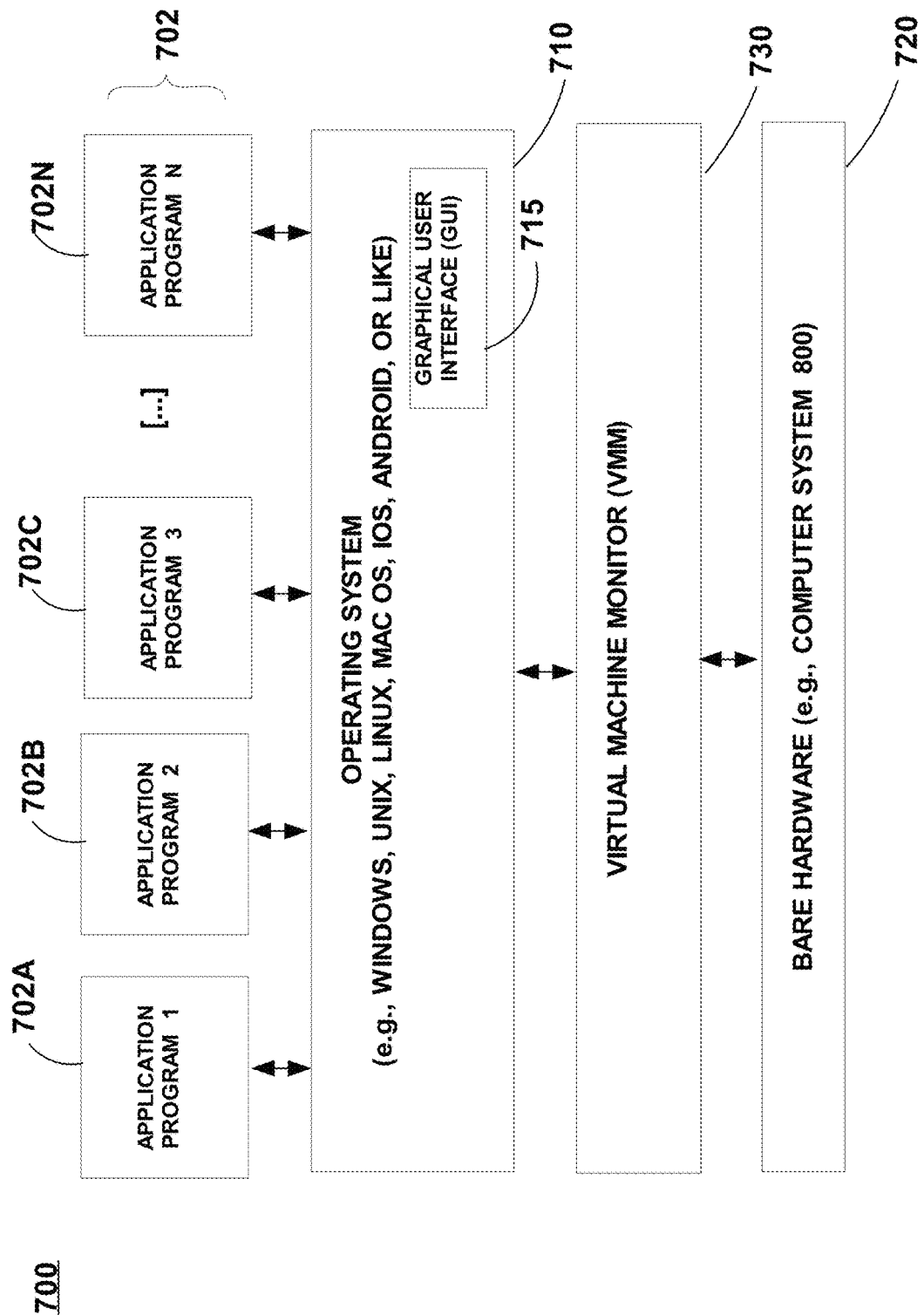
FIG. 7 is a diagram depicting a software system that may be used in an embodiment.

FIG. 7 is a block diagram of a basic software system 700 that may be employed for controlling the operation of computing system 800 of FIG. 7. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 800. Software system 700, which may be stored in system memory (RAM) 806 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 810 into memory 806) for execution by the system 700. The applications or other software intended for use on computer system 800 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system (OS) to run as if the guest OS is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Multi-Node Database Management System

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
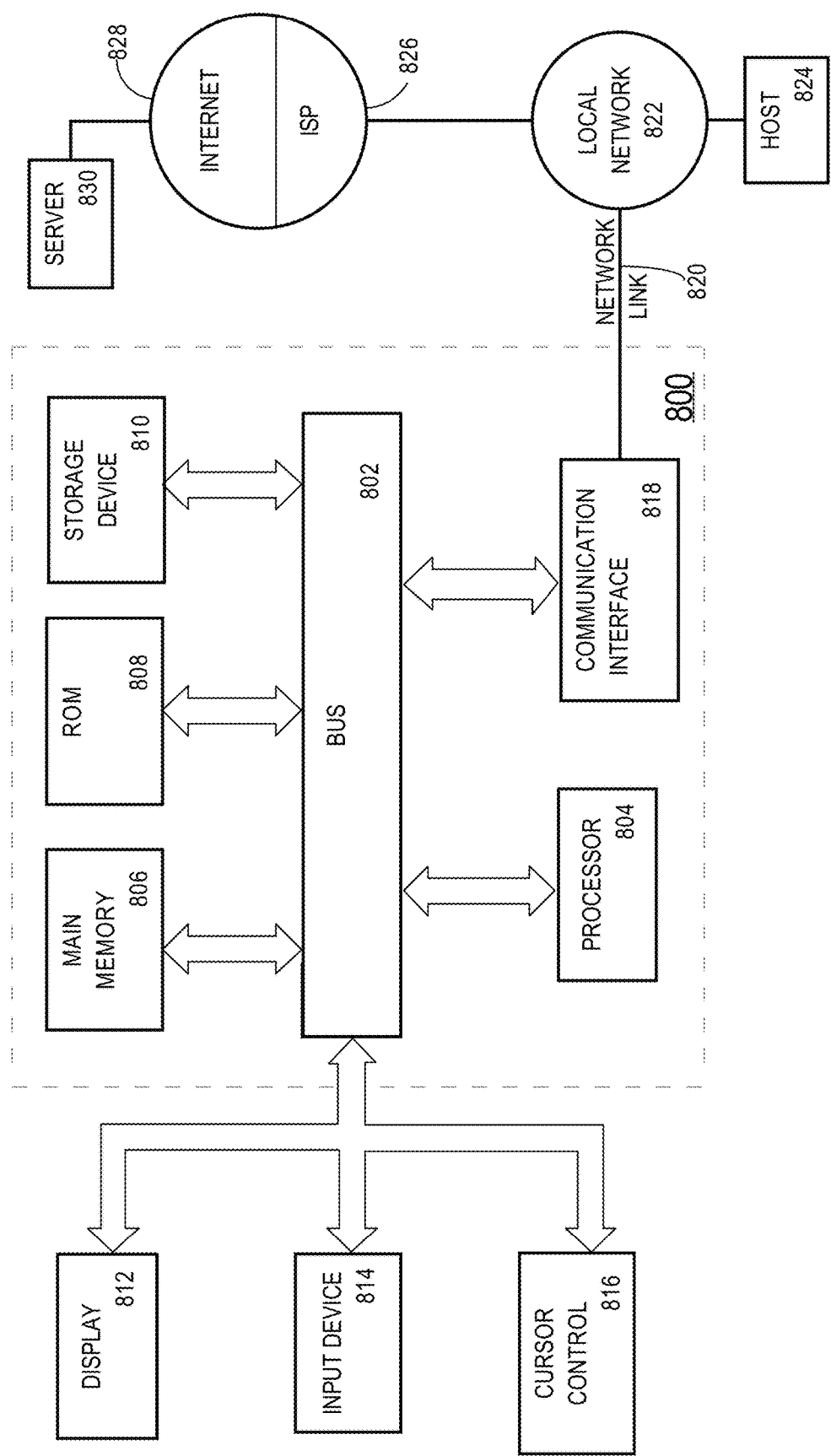
FIG. 8 is a diagram depicting a computer system that may be used in an embodiment.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   receiving a query block of a query;
   initializing a set of data structures, comprising:
     a first mapping between attributes referenced within the query block and a first set of unique numbers in a range that is based on a number of attributes referenced by the query block;
     a second mapping between operators applied within the query block and a second set of unique numbers; and
     a third mapping between each operator associated with the query block and attributes referenced by that operator within the query block, the third mapping being based on the first set of unique numbers and the second set of unique numbers;
   prior to executing the query block, computing, for a query sub-plan of the query block, one or more projected attributes associated with the query sub-plan, the computing based on:
     applied operations of input operator trees that generate the query sub-plan;
     available attributes provided by input operators of the query sub-plan; and
     the set of data structures as initialized;
   generating data associating the one or more projected attributes as columnar information associated with the query sub-plan;
   computing a query execution cost based on the columnar information associated with the query sub-plan; and
   executing a query execution plan that includes said query sub-plan based on the query execution cost;
   wherein the method is performed by one or more computing devices.

2. The method of claim 1, wherein initializing the set of data structures further comprises:
   generating a fourth mapping between the first set of unique numbers and the attributes referenced within the query block, wherein the fourth mapping is an inverse of the first mapping;
   generating a bit vector of required attributes for the query block; and
   generating a bit vector of all operators applied within the query block.

3. The method of claim 2, wherein computing one or more projected attributes for the query sub-plan comprises:
   computing a bit vector of available attributes for an operator tree associated with the query sub-plan;
   computing a bit vector of applied operators for the operator tree associated with the query sub-plan;
   computing a bit vector of missing operators of the query sub-plan based on the bit vector of applied operators for the operator tree associated with the query sub-plan, and the bit vector of all operators associated with the query block;
   computing a bit vector of missing attributes associated with the missing operators;
   determining a bit vector of projected attributes for the query sub-plan; and
   determining the projected attributes for the query sub-plan based on the bit vector of projected attributes for the query sub-plan and the fourth mapping.

4. The method of claim 3, wherein computing a bit vector of available attributes for an operator tree associated with the query sub-plan comprises computing a union of the available attributes for input operator trees that together generate the operator tree associated with the query sub-plan.

5. The method of claim 3, wherein computing a bit vector of applied operators for the operator tree comprises computing a union of: an operator at a root of an operator subtree associated with the query sub-plan, and applied operators for input operator trees that together generate the operator tree associated with the query sub-plan.

6. The method of claim 3, wherein computing a bit vector of missing attributes associated with the missing operators is based on the bit vector of missing operators of the query sub-plan, and the third mapping.

7. The method of claim 3, wherein determining a bit vector of projected attributes is based on the bit vector of missing attributes, the bit vector of required attributes, and the bit vector of available attributes.

8. The method of claim 2, wherein generating a bit vector of required attributes for the
   query block comprises setting a bit for each attribute that is required to be returned by the query block, wherein a number mapped to an attribute in the first mapping is used as a bit index into the bit vector of required attributes for the query block.

9. The method of claim 2, wherein generating the second mapping comprises:
gathering all operators applied within the query block, the operators comprising join predicates, local predicates, order-by operations, group-by operations, and window functions; and
assigning a unique number in a range that is based on a total number of operations to each gathered operator.

10. The method of claim 9, wherein generating a bit vector of all operators applied within the query block comprises setting a bit for each operator that is assigned a unique number, wherein a bit index of the bit vector of all operators applied within the query block corresponds to an assigned unique number in the second mapping.

11. The method of claim 2, wherein generating the third mapping comprises assigning, for each operator applied in the query block, a mapping to referenced attributes of that operator.

12. A non-transitory computer-readable storage medium storing instructions that, when executed by one or more processors, cause:
receiving a query block of a query;
initializing a set of data structures, comprising:
a first mapping between attributes referenced within the query block and a first set of unique numbers in a range that is based on a number of attributes referenced by the query block;
a second mapping between operators applied within the query block and a second set of unique numbers; and
a third mapping between each operator associated with the query block and attributes referenced by that operator within the query block, the third mapping being based on the first set of unique numbers and the second set of unique numbers;
prior to executing the query block, computing, for a query sub-plan of the query block, one or more projected attributes associated with the query sub-plan, the computing based on:
applied operations of input operator trees that generate the query sub-plan;
available attributes provided by input operators of the query sub-plan; and
the set of data structures as initialized;
generating data associating the one or more projected attributes as columnar information associated with the query sub-plan;
computing a query execution cost based on the columnar information associated with the query sub-plan; and
executing a query execution plan that includes said query sub-plan based on the query execution cost;
wherein the method is performed by one or more computing devices.

13. The non-transitory computer-readable storage medium of claim 12, wherein initializing the set of data structures further comprises:
generating a fourth mapping between the first set of unique numbers and the attributes referenced within the query block, wherein the fourth mapping is an inverse of the first mapping;
generating a bit vector of required attributes for the query block; and
generating a bit vector of all operators applied within the query block.

14. The non-transitory computer-readable storage medium of claim 13, wherein computing one or more projected attributes for the query sub-plan comprises:
computing a bit vector of available attributes for an operator tree associated with the query sub-plan;
computing a bit vector of applied operators for the operator tree associated with the query sub-plan;
computing a bit vector of missing operators of the query sub-plan based on the bit vector of applied operators for the operator tree associated with the query sub-plan, and the bit vector of all operators associated with the query block;
computing a bit vector of missing attributes associated with the missing operators;
determining a bit vector of projected attributes for the query sub-plan; and
determining the projected attributes for the query sub-plan based on the bit vector of projected attributes for the query sub-plan and the fourth mapping.

15. The non-transitory computer-readable storage medium of claim 14, wherein computing a bit vector of available attributes for an operator tree associated with the query sub-plan comprises computing a union of the available attributes for input operator trees that together generate the operator tree associated with the query sub-plan.

16. The non-transitory computer-readable storage medium of claim 14, wherein computing a bit vector of applied operators for the operator tree comprises computing a union of: an operator at a root of an operator subtree associated with the query sub-plan, and applied operators for input operator trees that together generate the operator tree associated with the query sub-plan.

17. The non-transitory computer-readable storage medium of claim 14, wherein computing a bit vector of missing attributes associated with the missing operators is based on the bit vector of missing operators of the query sub-plan, and the third mapping.

18. The non-transitory computer-readable storage medium of claim 14, wherein determining a bit vector of projected attributes is based on the bit vector of missing attributes, the bit vector of required attributes, and the bit vector of available attributes.

19. The non-transitory computer-readable storage medium of claim 13, wherein generating a bit vector of required attributes for the query block comprises setting a bit for each attribute that is required to be returned by the query block, wherein a number mapped to an attribute in the first mapping is used as a bit index into the bit vector of required attributes for the query block.

20. The non-transitory computer-readable storage medium of claim 13, wherein generating the second mapping comprises:
gathering all operators applied within the query block, the operators comprising join predicates, local predicates, order-by operations, group-by operations, and window functions; and
assigning a unique number in a range that is based on a total number of operations to each gathered operator.

21. The non-transitory computer-readable storage medium of claim 20, wherein generating a bit vector of all operators applied within the query block comprises setting a bit for each operator that is assigned a unique number, wherein a bit index of the bit vector of all operators applied within the query block corresponds to an assigned unique number in the second mapping.

22. The non-transitory computer-readable storage medium of claim 13, wherein generating the third mapping comprises assigning, for each operator applied in the query block, a mapping to referenced attributes of that operator.

\* \* \* \* \*

UNITED STATES PATENT AND TRADEMARK OFFICE
CERTIFICATE OF CORRECTION

Page 1 of 1

PATENT NO. : 10,783,143 B2
APPLICATION NO. : 15/791712
DATED : September 22, 2020
INVENTOR(S) : Fender et al.

It is certified that error appears in the above-identified patent and that said Letters Patent is hereby corrected as shown below:

In the Specification

In Column 7, Line 60, Delete "[qperation]" and insert -- [operation] --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*